(12) United States Patent
Wuerthele et al.

(10) Patent No.: US 11,760,141 B2
(45) Date of Patent: Sep. 19, 2023

(54) ENGINE DRIVE AIR COMPRESSOR WITH FRAME STORAGE TANK

(71) Applicant: TOYOTA MOTOR ENGINEERING & MANUFACTURING NORTH AMERICA, INC., Plano, TX (US)

(72) Inventors: Stuart Roger Wuerthele, Saline, MI (US); Paxton S. Williams, Milan, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 912 days.

(21) Appl. No.: 16/680,271

(22) Filed: Nov. 11, 2019

(65) Prior Publication Data

US 2021/0138853 A1    May 13, 2021

(51) Int. Cl.
| | |
|---|---|
| *B60C 23/16* | (2006.01) |
| *B60L 1/00* | (2006.01) |
| *B60C 23/14* | (2006.01) |
| *B62D 21/02* | (2006.01) |
| *B62D 21/16* | (2006.01) |
| *B60C 29/06* | (2006.01) |
| *B60C 23/10* | (2006.01) |
| *G01L 19/08* | (2006.01) |

(52) U.S. Cl.
CPC .............. *B60C 23/16* (2013.01); *B60C 23/10* (2013.01); *B60C 23/14* (2013.01); *B60C 29/064* (2013.01); *B60L 1/003* (2013.01); *B62D 21/02* (2013.01); *B62D 21/16* (2013.01); *G01L 19/083* (2013.01)

(58) Field of Classification Search
CPC ......... B60C 23/16; B60C 23/10; B60C 23/14; B60C 29/064; B60C 23/0433; B60L 1/003; B62D 21/02; B62D 21/16; G01L 19/083
USPC ....................................................... 296/184.1
See application file for complete search history.

(56) References Cited

U.S. PATENT DOCUMENTS

| | | | | |
|---|---|---|---|---|
| 2,634,783 | A | * | 4/1953 | Turek ................ B60C 23/00318 137/224 |
| 2,715,430 | A | * | 8/1955 | Myrla ............... B60C 23/00372 152/416 |
| 3,495,787 | A | | 2/1970 | Wallace |
| 4,224,013 | A | | 9/1980 | Davis, Sr. |
| 4,582,108 | A | * | 4/1986 | Markow ................. B60C 23/10 137/355 |
| 5,489,765 | A | * | 2/1996 | Fezza ................... G05D 23/275 219/508 |
| 5,730,177 | A | | 3/1998 | Kim |
| 5,876,526 | A | * | 3/1999 | Hamade .................... B66F 3/12 60/407 |

(Continued)

FOREIGN PATENT DOCUMENTS

WO   WO-2017116628 A1 *  7/2017  ........... B60C 23/003

*Primary Examiner* — Eric Blount
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for providing a tire pressure enhancing device for increasing the air pressure of tires mounted on a vehicle. For example, an air compressor may be coupled to an engine of a vehicle to compress air. The compressed air is then stored in the frame of the vehicle. The compressed air may be transferred to each tire through a hose via an access point in the frame.

20 Claims, 6 Drawing Sheets

(56) References Cited

U.S. PATENT DOCUMENTS

| | | | |
|---|---|---|---|
| 6,144,295 A * | 11/2000 | Adams | B60C 23/00354 |
| | | | 137/224 |
| 9,789,739 B1 * | 10/2017 | Hennig | B60S 5/04 |
| 9,868,381 B1 | 1/2018 | Swope | |
| 10,953,706 B2 * | 3/2021 | Duncan | B60C 23/00345 |
| 2003/0071722 A1 | 4/2003 | Cole | |
| 2012/0023991 A1 * | 2/2012 | Czechowski | B60C 23/10 |
| | | | 152/415 |
| 2019/0001805 A1 * | 1/2019 | Colavincenzo | B60W 20/15 |

* cited by examiner

ENGINE DRIVE AIR COMPRESSOR WITH FRAME STORAGE TANK

TECHNICAL FIELD

The present disclosure relates generally to providing compressed air to a tire of a vehicle while the tire is mounted on the vehicle. In some embodiments, the compressed air may be stored in the structural frame of the vehicle.

DESCRIPTION OF RELATED ART

Stationary air compressors are often used to transfer compressed air to a tire of the vehicle. These stationary air compressors may be stationary due to their size or due to a requirement to provide electricity or fuel to power the compressors. When vehicles are located in remote locations or on the road, these vehicles might not have access to a source of compressed air to maintain proper tire pressure. This can force drivers to operate their vehicles with improper air pressure until a tire can be refilled or result in having to stop or go out of their way in order to refill their tires.

BRIEF SUMMARY OF THE DISCLOSURE

According to various embodiments of the disclosed technology, a vehicle and/or vehicle structural frame is described. The vehicle may comprise: a vehicle structural frame; an air storage tank incorporated within the vehicle structural frame; an air compressor, wherein the air compressor is coupled to provide compressed air to the air storage tank; and an access point coupled with the air storage tank within the vehicle structural frame, wherein the compressed air is provided to the access point from the air compressor for storage within the vehicle structural frame. In some embodiments, the access point is part of a plurality of access points, and the vehicle and/or vehicle structural frame further comprises: the plurality of access points incorporated with the vehicle structural frame, wherein a hose is coupled with at least one of the plurality of access points to transport the compressed air from the vehicle structural frame to a tire of the vehicle via the hose. In some embodiments, the vehicle and/or vehicle structural frame comprises an second hose, wherein the second hose is placed between the air storage tank and the access point to transfer the air from the air compressor to the vehicle structural frame. In some embodiments, the air storage tank comprises an airtight bladder disposed within a frame rail or tube of the vehicle structural frame. In some embodiments, the air storage tank comprises an airtight portion of the vehicle structural frame. In some embodiments, the vehicle and/or vehicle structural frame comprises an interface, wherein the interface is placed at a control panel coupled with the vehicle, and wherein the interface displays an indication of the compressed air generated by the air compressor. In some embodiments, the air compressor is coupled to a motor, and the vehicle is an electric vehicle (EV). In some embodiments, the air compressor is coupled to an internal combustion engine. In some embodiments, the vehicle and/or vehicle structural frame comprises a frame storage tank pressure monitoring sensor, wherein the frame storage tank pressure monitoring sensor compares a current measured pressure of the air in the air storage tank to a threshold pressure or threshold pressure range to determine whether the air storage tank is within an acceptable range. In some embodiments, the vehicle and/or vehicle structural frame comprises an actuator, wherein the actuator is configured to provide compressed air from the compressor when the air storage tank is under pressure.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
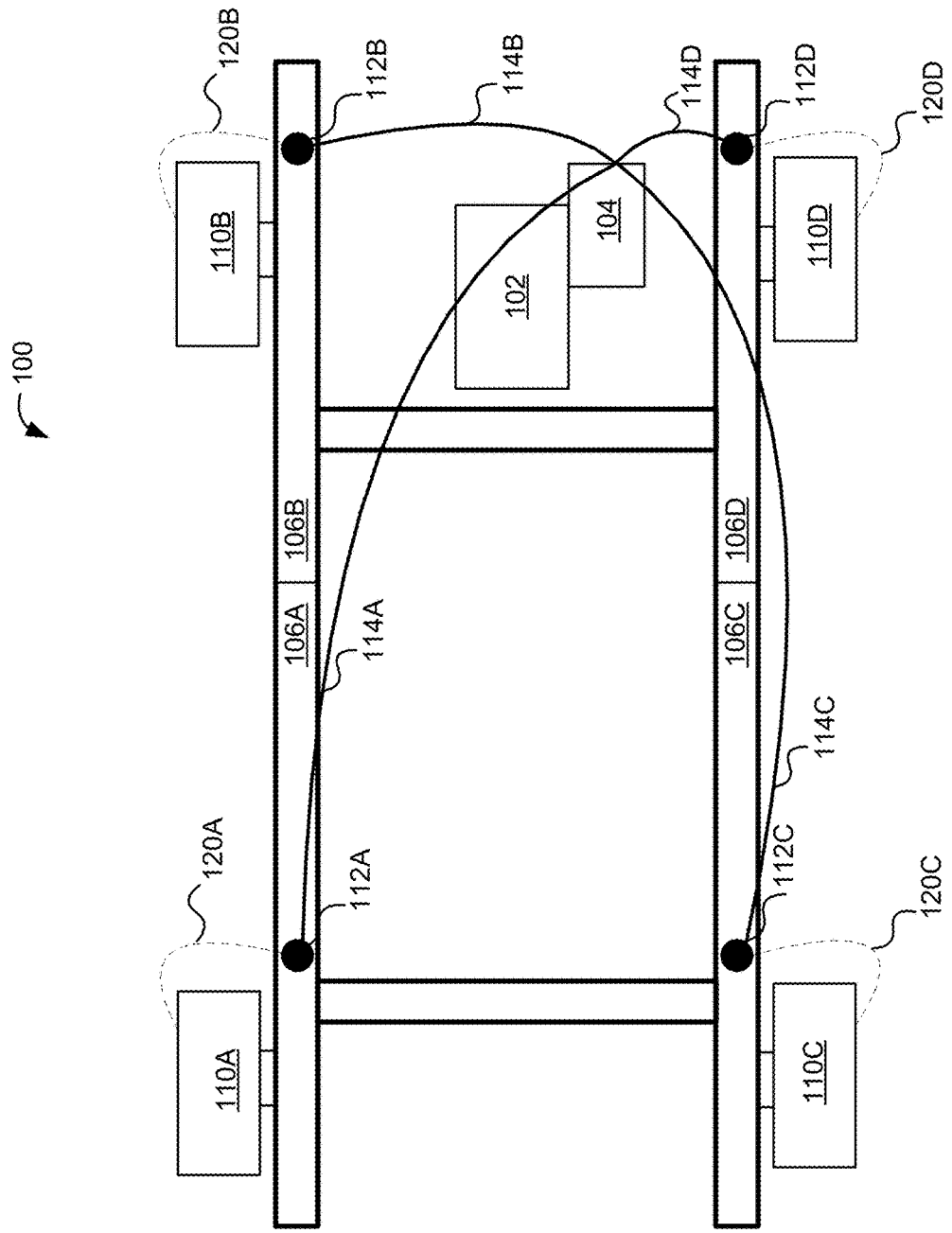
FIG. 1 illustrates an example vehicle frame with a plurality of access points with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein can provide a vehicle structural frame for storing compressed air from a tire pressure enhancing device for increasing or otherwise adjusting the air pressure of a tire mounted on a vehicle. For example, embodiments may include a frame of a vehicle adapted for storage of compressed air. Any air-tight portion of the frame may be used as a storage tank to store the compressed air, including the entirety of the frame or a compartment of the frame. In some examples, one or more internal bladders may be implemented within the frame to store the compressed air in a smaller, airtight compartment (or compartments) of the larger frame. The compressed air may be transferred from the frame to each tire through a first hose or a first series of hoses. Appropriate length hoses may be provided to connect each wheel of the vehicle to one or more access points in the frame rail to provide compressed air to each tire. A vehicle structural frame may include, for example, a main supporting structure of the vehicle such as a ladder frame, x-frame, perimeter frame, space frame, subframe (e.g., a subframe structure connected to a monocoque or unibody structure), or other like frame structure, including frame rails or frame tubing.

The compressed air may be received in the frame storage tank by a second hose or series of hoses coupled with a compressor. The frame storage tank may be filled with compressed air from a stationary compressor (e.g. at a service station, depot or other facility) or from a compressor mounted on the vehicle. A vehicle mounted compressor may be coupled to the vehicle's engine or motor (e.g., in the case of an EV or HEV) to power the compressor to compress air that can be used to fill the frame storage tank and ultimately inflate the tires. For example, in an internal combustion engine, a rotating component of the engine such as the crankshaft, camshaft, driveshaft or other rotating component of the engine can be coupled by a belt or chain to a rotary (screw type) compressor. Alternatively, electricity generated by an alternator of the internal combustion engine can be used to power an electric air compressor. As another example, in an electric vehicle (EV) or hybrid-electric vehicle (HEV) having an electric motor, the electric power source (e.g., a battery or series of batteries) used to provide power to the motor can also provide electrical power to an electric air compressor to compress the air.

The system can receive information from vehicle sensors such as, for example, a frame storage tank pressure monitoring sensor. For example, the system can compare a current measured pressure of the air in the frame storage tank to a threshold pressure or threshold pressure range to determine whether the frame storage tank is within an acceptable range. If the frame storage tank is under pressure, the system may engage an actuator or series of actuators to provide compressed air from the compressor to the under-pressure to ensure that the compressed air stored in the frame storage tank is maintained at or above the threshold pressure, or within an appropriate pressure range.

The system can also receive information from vehicle sensors such as, for example, tire pressure monitoring sensors to determine tire pressure of one or more vehicle tires. The system can compare a current measured pressure of a tire to a threshold pressure or threshold pressure range for that tire to determine whether the tire is within an acceptable range or otherwise adequately inflated. If the tire is under pressure (e.g., below a threshold or below the acceptable range), the system engages an actuator or series of actuators to provide compressed air from the compressor to the under-pressure tire to increase the inflation pressure of the tire. In some embodiments, this compressed air can be provided directly from the compressor output while in other embodiments the compressed air can be provided from a storage tank (e.g., vehicle frame or bladder) that is supplied compressed air from the compressor. The system can also be configured to start and stop the compressor as needed to supply compressed air to the tire or to maintain adequate supply of compressed air in the storage tank. Alternatively, if the tire pressure data indicates that the tire is over the pressure range or a high-pressure threshold, the system can engage an actuator to open a release valve to release air from the tire until the tire pressure is within acceptable range.

The compressed air may be transferred to the vehicle frame from the storage tank or directly from the compressor using a second hose or a second series of hoses. In some embodiments, the first hose(s) used to transfer the compressed air from the frame to each tire are stored in the vehicle and may be provided with a built-in pressure gauge, while the second hose(s) used to transfer air from the compressor to the frame storage tank are fixedly mounted and coupled with frame storage tank and air compressor. Alternatively, the first hoses may be fixed and coupled with the frame and the wheels of the vehicle.

The systems and methods disclosed herein may be implemented with any number of different vehicles and vehicle types, including gasoline- or diesel-powered vehicles, fuel-cell vehicles, electric vehicles, or other vehicles. Vehicles may include automobiles, trucks, motorcycles, recreational vehicles, and other like on-or off-road vehicles. In addition, the principals disclosed herein may also extend to other vehicle types as well.

Various advantages are realized through embodiments of the application. For example, a plurality of access points can be incorporated with the frame of the vehicle to allow for quick access to compressed air to refill and increase air pressure in tires. Alternatively, a single access point may be is incorporated with the frame of the vehicle to simplify hose storage and minimize manufactured holes in the frame.

FIG. 1 illustrates an example vehicle frame with a plurality of access points with which embodiments of the systems and methods disclosed herein may be implemented. In illustration 100, engine 102, compressor 104, and frame 106 are provided. For example, an alternator of engine 102 may generate electricity to power an electric air compressor, including compressor 104.

The compressed air can be provided from compressor 104 to access point(s) 112 in the frame to supply air to the frame storage tank. In this example, the frame storage tank is divided into four separate storage compartments 106 (illustrated as 106A, 106B, 106C, 106D) and there is an access point 112 for each storage compartment 116 (illustrated as access point 112A, 112B, 112C, 112D). The compressed air is provided from compressor 104 via hose 114 (illustrated as hose 114A, 114B, 114C, 114D) to the individual storage compartments 106A, 106B, 106C, 106D. Hose 114 may be constructed of material such as poly vinyl chloride (PVC), polyurethane, nylon, Kevlar, rubber, aluminum, stainless steel, brass or other materials for transporting the compressed air. Hose 114 may be a static line that couples output from compressor 104 with frame 106. Access points 112 may be implemented as, for example, brass, stainless steel or aluminum couplings or fittings.

Frame 106 may form the frame storage tank to store the compressed air. Any air-tight portion of frame 106 may be used to store the compressed air, including the entirety of frame 106 or a compartment of frame 106 (illustrated as four compartments 106A, 106B, 106C, 106D). Frame 106 may be sealed or reinforced to prevent the compressed air from escaping from frame 106. Individual compartments may be used to provide compressed air to each tire without affecting the pressure levels of other compartments of frame 106. In some examples, one or more internal bladders may be implemented within frame 106 or one or more compartments of frame 106A, 106B, 106C, 106D form the frame storage tank to store the compressed air in a smaller compartment (or compartments) of the larger frame, as illustrated with FIG. 3. Although four compartments 106A, 106B, 106C, 106D are illustrated in this example (one for each wheel) other quantities of storage tanks can be provided.

The compressed air may be transferred from frame 106 to each tire 110 (illustrated as 110A, 110B, 110C, 110D) through hose 120 or series of hoses (illustrated as 120A, 120B, 120C, 120D). Hose 120 may be constructed of material such as poly vinyl chloride (PVC), polyurethane, nylon, Kevlar, rubber, aluminum, stainless steel, brass or other materials for transporting the compressed air. Each hose 120 may be connected to its corresponding wheel and be configured to remain connected while the vehicle is in motion. Another embodiments, each hose 120 may be stored and connected by the driver or other user for filling operations. In embodiments where hoses are not permanently connected and are stored, each second hose 120 may be stored within approximate distance of the corresponding tire and access point 112 (illustrated as 112A, 112B, 112C, 112D) for ease of access. Each second hose 120 may be tailored to an appropriate length to span the distance between its access point 112 and corresponding wheel 110 to minimize an amount of hose that is stored within the vehicle or in association with frame 106.

In a sample illustration, each tire may be filled with compressed air from a corresponding hose and access point in frame 106. For example, first tire 110A may be filled with compressed air stored in frame compartment 106A that is accessible through first access point 112A and using first hose 120A. Second tire 1106 may be filled with compressed air stored in frame compartment 106B that is accessible through second access point 112B and using second hose 120B. Third tire 110C may be filled with compressed air stored in frame compartment 106C that is accessible through third access point 112C and using third hose 120C. Fourth tire 110D may be filled with compressed air stored in frame compartment 106D that is accessible through fourth access point 112D and using fourth hose 120D. The example in FIG. 1 illustrates four compartments, or four separate storage tanks, such that there is one storage tank for each wheel. Other embodiments may have other quantities of separate storage tanks.

Figure 2:
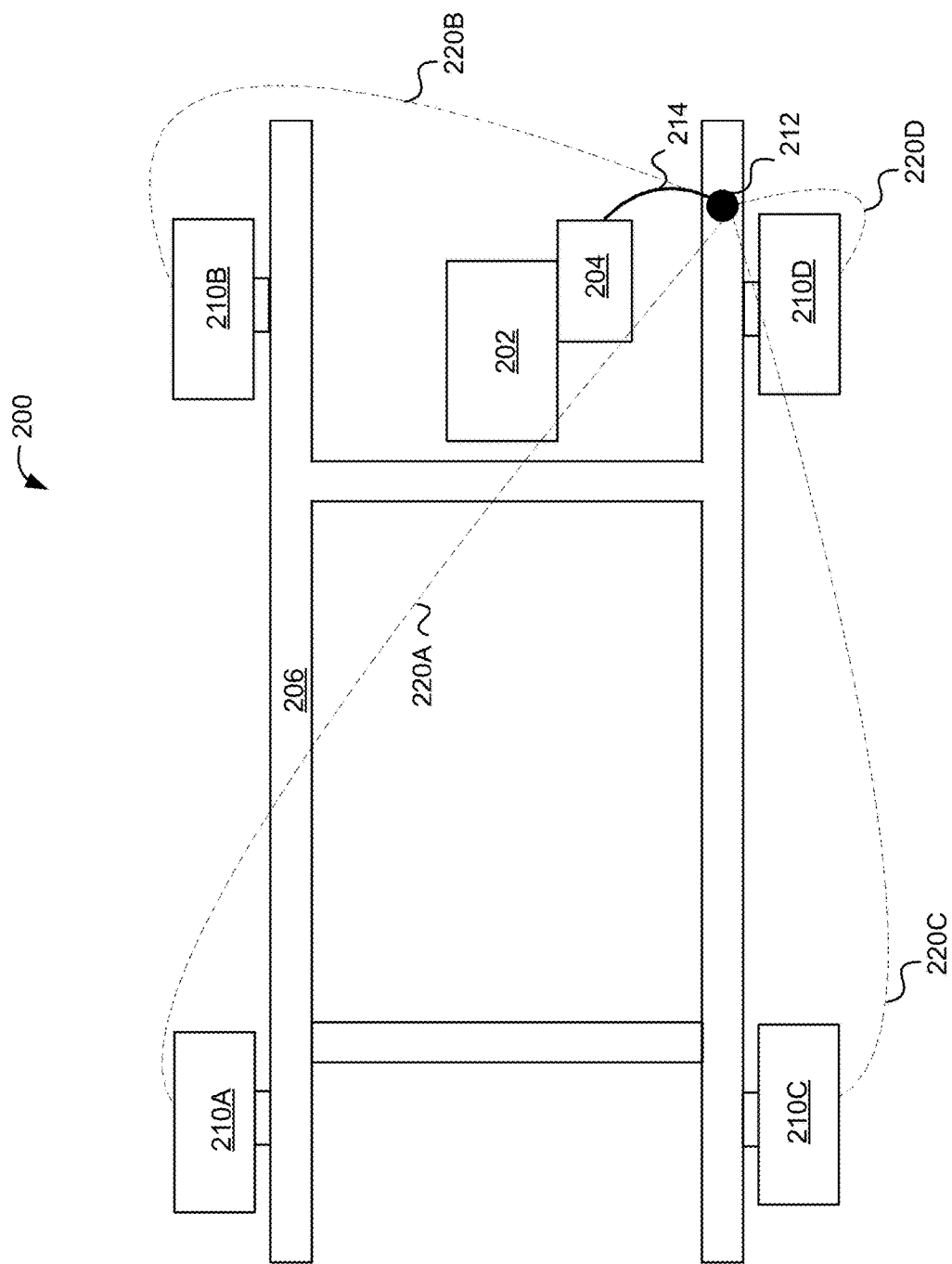
FIG. 2 illustrates an example vehicle frame with a single access point with which embodiments of the systems and methods disclosed herein may be implemented.

FIG. 2 illustrates an example vehicle frame with single access point with which embodiments of the systems and methods disclosed herein may be implemented. In the example illustrated in FIG. 2, each tire 110 may receive the compressed air through a single access point 212 of frame 206. In illustration 200, engine 202, compressor 204, and frame 206 are provided, and are similar to engine 102, compressor 104, and frame 106 of FIG. 1, however only one access point is implemented with frame 206 whereas a plurality of access points are implemented with frame 106. The compressed air generated from compressor 204 may be transported by hose 214 to frame 206, and more particularly to a frame storage tank of frame 206. The pressure of the compressed air generated by compressor 204 and stored with the frame storage tank of frame 206 may be measured by a sensor to determine when to start and stop the compressor as needed to maintain adequate pressure of compressed air in frame 206. Hoses 220 (illustrated as hoses 220A, 220B, 220C, 220D) may transport the compressed air from frame 206 to each tire 210 (illustrated as 210A, 210B, 210C, 210D). The length of hoses 220 may long enough so that each shows hose 220 can provide air to its corresponding tire 210 from a single access point 212.

With reference to FIGS. 1 and 2, the coupling of each hose 120, 220 to each tire 110, 210 may be performed manually when the user fills a tire with their hose. For example, hose 120, 220 may be stored within the vehicle. When compressed air is needed, hose 120, 220 may be removed from storage and engaged with access point 112, 212 and used to inflate the corresponding tire 110, 210. In such embodiments utilizing manual inflation, the system can be provided with a single hose of sufficient length to reach from access point 112, 212 to the farthest wheel. In other manual embodiments, separate hoses can be provided.

Figure 3:
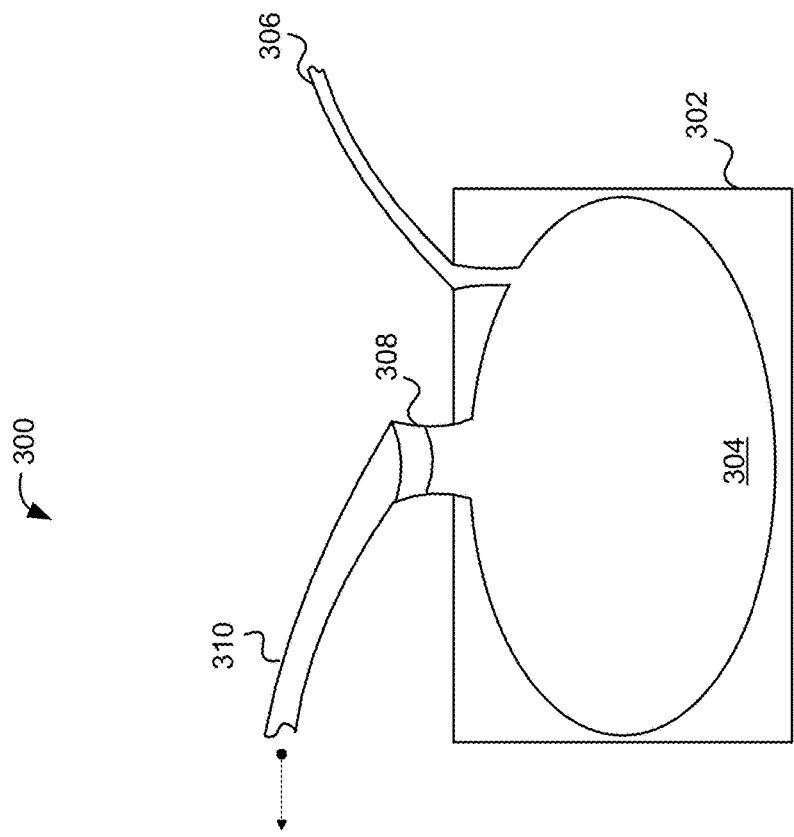
FIG. 3 illustrates an example vehicle frame and wheel with which embodiments of the systems and methods disclosed herein may be implemented.
Figure 3:
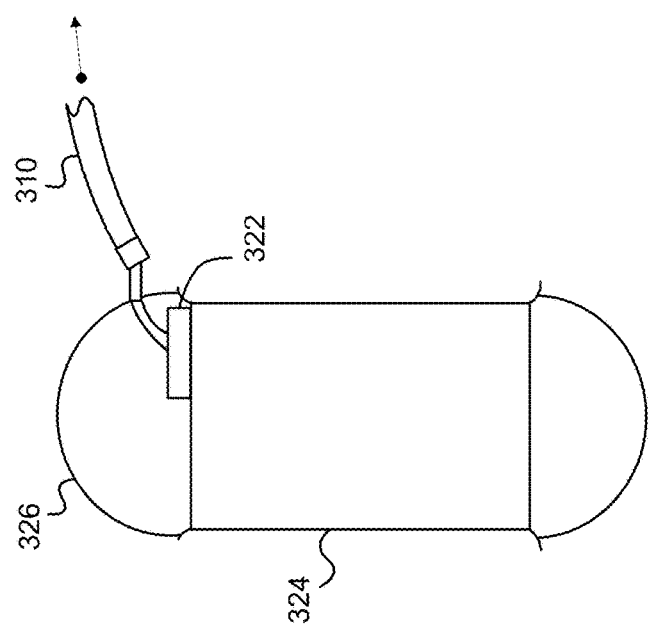

FIG. 3 illustrates cross-sectional views of an example vehicle frame and wheel/tire with which embodiments of the systems and methods disclosed herein may be implemented. In illustration 300, an airtight, sealable bladder 304 is provided within the openings of frame 302. Sealable bladder 304 in this example fits entirely within closed frame rails. In other embodiments, frame 302 may comprise an open structure (e.g. U-rails or I-rails) and bladder 304 may be configured to run within the space provided by the rails. Bladder 304 forms a frame storage tank that is used to store compressed air that is provided to tire 326 (e.g., tires 110, 210) that is mounted on wheel 324.

Bladder 304 may receive compressed air from a compressor (e.g. compressor 104 or compressor 204) via hose 306. A frame pressure monitoring sensor (not illustrated) may sense the pressure of the air contained in bladder 304 and transmit data representing the current measured pressure value to a frame circuit incorporated with a vehicle system of the vehicle. The frame circuit may compare the current measured pressure value to a threshold pressure or threshold pressure range to determine whether the air pressure of frame 302 (or bladder 304) is within an acceptable range.

The system may be engaged to provide compressed air to tire 326, for example, by actuating a valve 308. Upon opening valve 308, the compressed air from bladder 304 may be provided through hose 310.

Tire pressure monitoring system (TPMS) 322 or other sensor may monitor air pressure inside tire 326. For example, TPMS 322 may be coupled to a valve stem to engage and couple hose 310 to TPMS 322. In some examples, TPMS 322 is not coupled to the valve stem. TPMS 322 may be configured to determine a current air pressure in tire 326 and transmit the current measured pressure to a compressor circuit incorporated with the vehicle system of the vehicle. The compressor circuit may compare the current measured pressure value to a threshold pressure or threshold pressure range to determine whether the air pressure of tire 326 is within an acceptable range. When the current measured pressure value of tire 326 is less than the threshold pressure, the compressor circuit may engage an actuator (e.g., valve 308) to allow air to flow from bladder 304 through hose 310 to the inside of tire 326. Where the air pressure of to activate the compressor to generate compressed air and increase inflation pressure of tire 326. When the current measured pressure value is greater than a maximum threshold pressure, the compressor circuit may engage an actuator to open a relief valve (not illustrated) to release air from tire 326 until tire pressure measured by TPMS 322 is within an acceptable range.

Figure 4:
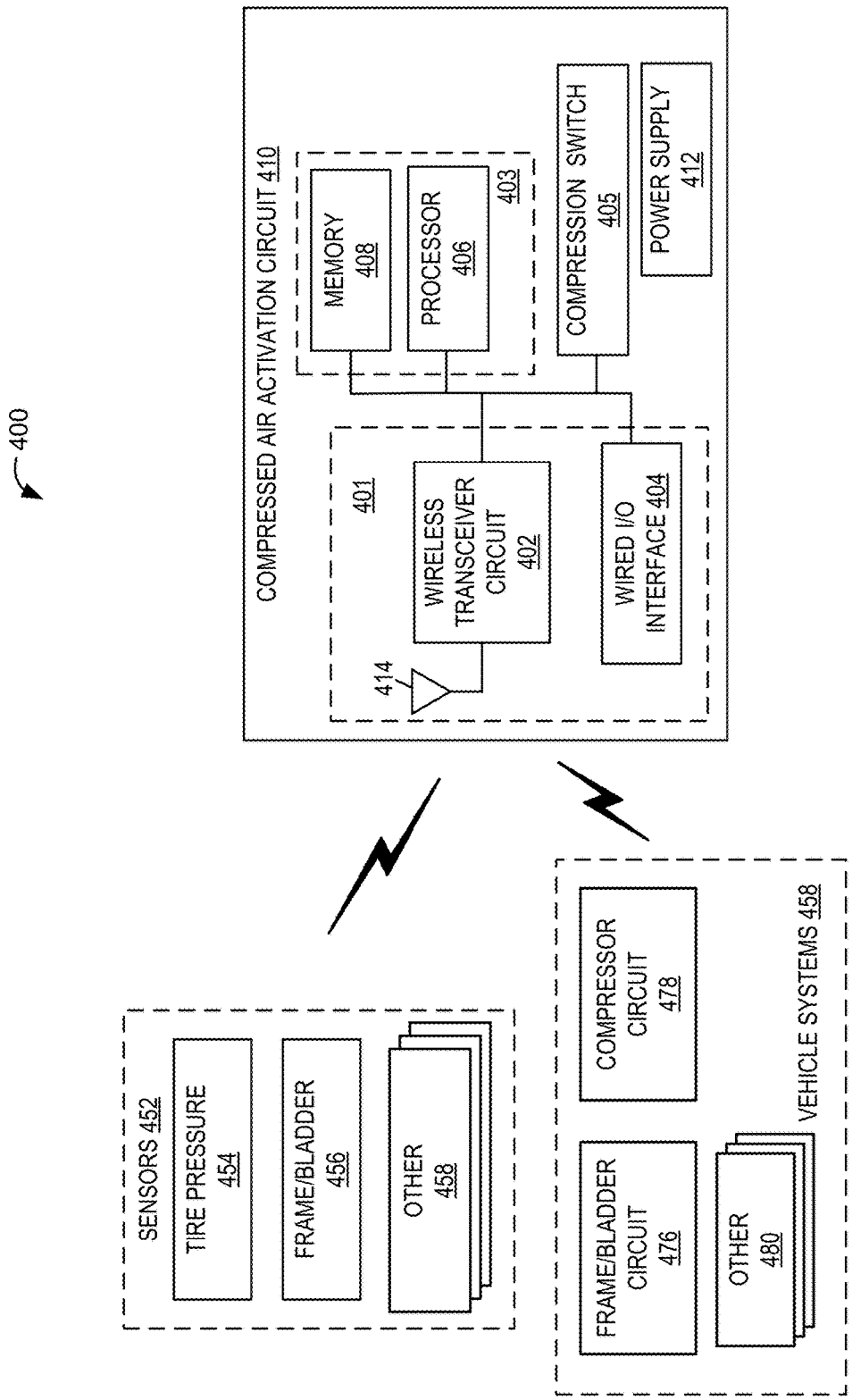
FIG. 4 illustrates an example architecture for providing pressurized air to a tire of a vehicle in accordance with one embodiment of the systems and methods described herein.

FIG. 4 illustrates an example architecture for providing pressurized air to a tire of a vehicle in accordance with one embodiment of the systems and methods described herein. In this example, compressed air generation and storage system 400 includes compressed air activation circuit 410, plurality of sensors 452, and plurality of vehicle systems 458. Sensors 452 and vehicle systems 458 can communicate with compressed air activation circuit 410 via a wired or wireless communication interface. Although sensors 452 and vehicle systems 458 are depicted as communicating with compressed air activation circuit 410, they can also communicate with each other as well as with other vehicle systems. Compressed air activation circuit 410 can be implemented as an electronic control unit (ECU). In other embodiments, compressed air activation circuit 410 can be implemented independently of the ECU.

Compressed air activation circuit 410, in this example, includes communication circuit 401, decision circuit 403 (including a processor 406 and memory 408 in this example), and power supply 412. Components of compressed air activation circuit 410 are illustrated as communicating with each other via a data bus, although other communication interfaces can be included. Compressed air activation circuit 410, in this example, also includes manual compression switch 405 that can be operated by the user to manually initiate an air compression mode.

Processor 406 can include a GPU, CPU, microprocessor, or any other suitable processing system. Memory 408 may include one or more various forms of memory or data storage (e.g., flash, RAM, etc.) that may be used to store the threshold pressure (e.g., XX psi) or any other suitable information for processor 406. Memory 408 can be made up of one or more modules of one or more different types of memory and may be configured to store data and other information as well as operational instructions that may be used by processor 406 to enable operation of compressed air activation circuit 410.

Although the example of FIG. 4 is illustrated using processor and memory circuitry, as described below with reference to circuits disclosed herein, decision circuit 403 can be implemented utilizing any form of circuitry including, for example, hardware, software, or a combination thereof. By way of further example, one or more processors, controllers, ASICs, PLAs, PALs, CPLDs, FPGAs, logical components, software routines, or other mechanisms might be implemented to make up compressed air activation circuit 410.

Communication circuit 401 may implement a wireless transceiver circuit 402 with associated antenna 414 and/or wired I/O interface 404 with an associated hardwired data port (not illustrated). As this example illustrates, communications with compressed air activation circuit 410 can include either or both wired and wireless communications circuits 401. Wireless transceiver circuit 402 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked, or otherwise. Antenna 414 is coupled to wireless transceiver circuit 402 and is used by wireless transceiver circuit 402 to transmit radio signals wirelessly to wireless equipment with which it is connected and to receive radio signals as well. These RF signals can include information of almost any sort that is sent or received by compressed air activation circuit 410 to/from other entities such as sensors 452 and vehicle systems 458.

Wired I/O interface 404 can include a transmitter and a receiver (not shown) for hardwired communications with other devices. For example, wired I/O interface 404 can provide a hardwired interface to other components, including sensors 452 and vehicle systems 458. Wired I/O interface 404 can communicate with other devices using Ethernet or any of a number of other wired communication protocols whether standardized, proprietary, open, point-to-point, networked, or otherwise.

Power supply 412 can include one or more of a battery or batteries (such as, e.g., Li-ion, Li-Polymer, NiMH, NiCd, NiZn, and NiH$_2$, to name a few, whether rechargeable or primary batteries, etc.), a power connector (e.g., to connect to vehicle supplied power, etc.), an energy harvester (e.g., solar cells, piezoelectric system, etc.), or any other suitable power supply.

Sensors 452 can include sensors that are included on a standard vehicle or additional sensors that may or not otherwise be included on a standard vehicle with which compressed air generation and storage system 400 is implemented. In the illustrated example, sensors 452 include tire pressure sensor 454 that measures an amount of compressed air in one or more tires of the vehicle and frame pressure sensor 456 that measures an amount of compressed air in the frame or bladder of the vehicle.

Vehicle systems 458 can include any number of different vehicle components or subsystems used to control or monitor various aspects of the vehicle and its performance. In this example, the vehicle systems 458 include frame circuit 476 to control operation of a pressure gauge and valve associated with providing compressed air from the compressor to a tire, and compressor circuit 478 to control operation of the tire pressure monitoring sensor to control activation and deactivation of the air compressor by comparing the current measured pressure value with the threshold pressure, and other vehicle systems 480.

During operation, compressed air activation circuit 410 can receive information from various vehicle sensors to determine whether the air compressor should be activated to pressurize a frame storage tank or deactivated. Also, the driver may manually activate the air compression mode by operating manual compression switch 405. Switch 405 can include a single on/off switch to turn on or off the compressed air activation system. In other embodiments, a more comprehensive user interface can be provided such as via a touchscreen or other user interface to allow the user to control various aspects of the tire inflation system.

Communication circuit 401 can be used to transmit and receive information between compressed air activation circuit 410 and sensors 452, and compressed air activation circuit 410 and vehicle systems 458. Also, sensors 452 may communicate with vehicle systems 458 directly or indirectly (e.g., via communication circuit 401 or otherwise).

In various embodiments, communication circuit 401 can be used to send an activation signal or other activation information to various vehicle systems 458 as part of initiating the air compression mode. For example, communication circuit 401 can be used to send signals to, for example, one or more of: frame circuit 476 to control operation of a pressure gauge and valve associated with providing compressed air from the compressor to a tire; or compressor circuit 478 to control activation and deactivation of the air compressor by comparing the current measured pressure value of the tire with the threshold pressure. The decision regarding what action to take via these various vehicle systems 458 can be made based on the information detected by sensors 452.

Figure 5:
FIG. 5 illustrates example bib connectors for connecting a regulator to a hose, with which embodiments of the systems and methods disclosed herein may be implemented.

FIG. 5 illustrates example bib connectors for connecting a regulator to a hose, with which embodiments of the systems and methods disclosed herein may be implemented. Any of these bib connectors can be implemented without diverting from the essence of the disclosure.

Figure 6:
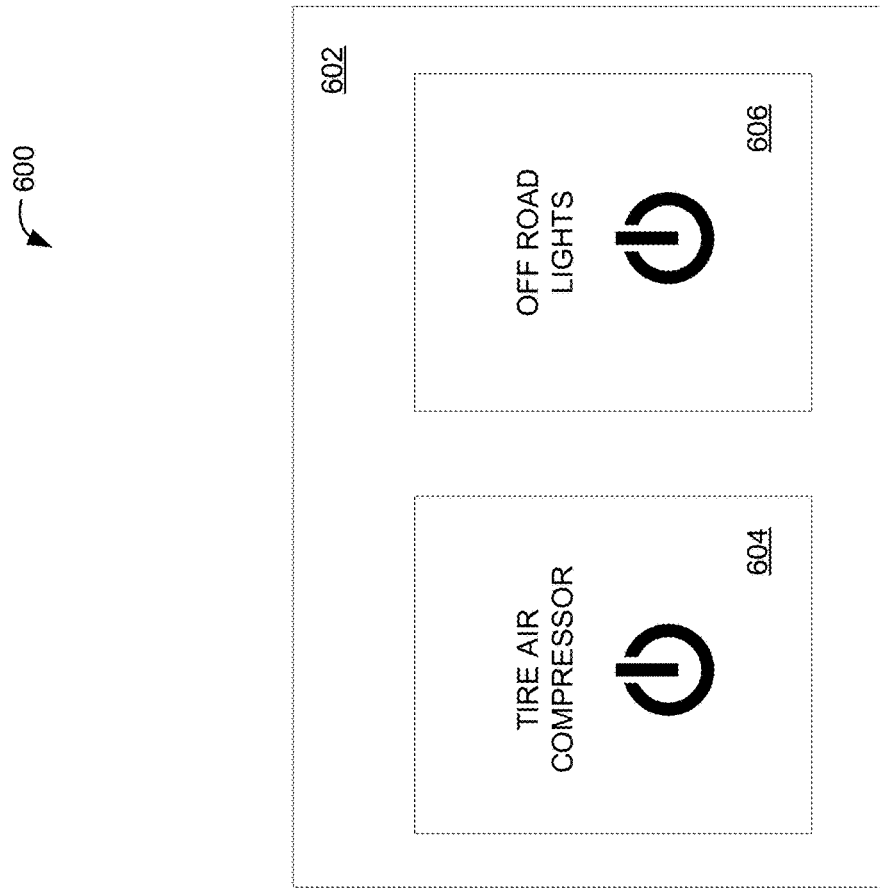
FIG. 6 illustrates an example interface for initiating air compression and storage within the vehicle frame, with which embodiments of the systems and methods disclosed herein may be implemented.

FIG. 6 is an illustrative interface for initiating air compression and storage within the vehicle frame hose, with which embodiments of the systems and methods disclosed herein may be implemented. In illustration 600, interface 602 may be placed at a control panel coupled with the vehicle. Interface 602 may comprise one or more manual switches within the vehicle, including the manual on/off switch 604 or other switches 606 (e.g., to power other vehicle systems like lights, brakes, etc.). Interface 602 may also display an indication that the compressed air is being generated by the air compressor and/or the amount of compressed air generated by the air compressor (e.g., "full" or 100 psi, etc.).

The driver of the vehicle may initiate the air compression process by pressing on/off switch 604 located on interface 602. Manual compression switch 604 may transmit a signal to compressed air activation circuit 410 to activate compressor circuit 478 to compress air. When the current measured pressure meets or exceeds the threshold pressure, compressor circuit 478 may be disengaged without further activation of manual compression switch 604. In some examples, the generation of compressed air may stop when manual compression switch 604 is pressed a second time, compressor circuit 478 and/or a clutch is manually disengaged.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Various computing components may be implemented in systems described throughout the disclosure. For example, the computing component may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. The computing component might also represent computing capabilities embedded within or otherwise available to a given device. For example, a computing component might be found in other electronic devices such as, for example, portable computing devices, and other electronic devices that might include some form of processing capability.

The computing component might include, for example, one or more processors, controllers, control components, or other processing devices. The processor might be implemented using a general-purpose or special-purpose processing engine such as, for example, a microprocessor, controller, or other control logic. The processor may be connected to a bus. However, any communication medium can be used to facilitate interaction with other components of The computing component or to communicate externally.

The computing component might also include one or more memory components, simply referred to herein as a main memory. For example, random access memory (RAM) or other dynamic memory, might be used for storing information and instructions to be executed by the processor. The main memory might also be used for storing temporary variables or other intermediate information during execution of instructions to be executed by the processor. The computing component might likewise include a read only memory ("ROM") or other static storage device coupled to a bus for storing static information and instructions for the processor.

The computing component might also include one or more various forms of information storage mechanism, which might include, for example, a media drive and a storage unit interface. The media drive might include a drive or other mechanism to support fixed or removable storage media. For example, a hard disk drive, a solid-state drive, a magnetic tape drive, an optical drive, a compact disc (CD) or digital video disc (DVD) drive (R or RW), or other removable or fixed media drive might be provided. Storage media might include, for example, a hard disk, an integrated circuit assembly, magnetic tape, cartridge, optical disk, a CD or DVD. Storage media may be any other fixed or removable medium that is read by, written to or accessed by media drive. As these examples illustrate, the storage media can include a computer usable storage medium having stored therein computer software or data.

In alternative embodiments, an information storage mechanism might include other similar instrumentalities for allowing computer programs or other instructions or data to be loaded into the computing component. Such instrumentalities might include, for example, a fixed or removable storage unit and an interface. Examples of such storage units and interfaces can include a program cartridge and cartridge interface, a removable memory (for example, a flash memory or other removable memory component) and memory slot. Other examples may include a PCMCIA slot and card, and other fixed or removable storage units and interfaces that allow software and data to be transferred from the storage unit to the computing component.

The computing component might also include a communications interface. The communications interface might be used to allow software and data to be transferred between The computing component and external devices. Examples of communications interface might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via the communications interface may be carried on signals, which can be electronic, electromagnetic (which includes optical) or other signals capable of being exchanged by a given communications interface. These signals might be provided to the communications interface via a channel. The channel might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., the memory, the storage unit, the media, and the channel. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
    an air storage tank incorporated within a vehicle structural frame;
    an air compressor to generate compressed air, wherein the air compressor is coupled to provide the compressed air to the air storage tank for storage in the air storage tank;
    an access point coupled with the air storage tank within the vehicle structural frame; and
    a plurality of hoses transporting the compressed air comprising a first type of hose connecting the air compressor to the air storage tank, and a second type of hose connecting the air storage tank to a tire of the vehicle;
    wherein in response to a control signal, the compressed air travels from the air storage tank, via the access point, to the tire through the second type of hose.

2. The vehicle of claim 1, wherein the access point is one of a plurality of access points, and the vehicle further comprises: the plurality of access points incorporated with the vehicle structural frame, wherein a supply hose is coupled with a second access point of the plurality of access points to transport the compressed air from the vehicle structural frame to a component of the vehicle via the hose.

3. The vehicle of claim 2, further comprises:
    an intermediate hose, wherein the intermediate hose is placed between the air storage tank and the access point to transfer the compressed air from the air compressor to the vehicle structural frame.

4. The vehicle of claim 1, wherein the air storage tank comprises an airtight bladder disposed within a frame rail or tube of the vehicle structural frame.

5. The vehicle of claim 1, wherein the air storage tank comprises an airtight portion of the vehicle structural frame.

6. The vehicle of claim 1, further comprises:
    an interface, wherein the interface is placed at a control panel coupled with the vehicle, and wherein the interface displays an indication of the compressed air generated by the air compressor.

7. The vehicle of claim 1, wherein the air compressor is coupled to a motor, and the vehicle is an electric vehicle (EV), wherein the air compressor is coupled to the motor to power the air compressor to generate the compressed air that is used to fill the air storage tank and ultimately inflate the tire of the vehicle.

8. The vehicle of claim 1, wherein the air compressor is coupled to an internal combustion engine, wherein the air compressor is coupled to the internal combustion engine to power the air compressor to generate the compressed air that is used to fill the air storage tank and ultimately inflate the tire of the vehicle.

9. The vehicle of claim 1, further comprises:
    a frame storage tank pressure monitoring sensor, wherein the frame storage tank pressure monitoring sensor compares a current measured pressure of the compressed air in the air storage tank to a threshold pressure or threshold pressure range to determine whether the air storage tank is within an acceptable range.

10. The vehicle of claim 8, further comprises:
    an actuator, wherein the actuator is configured to provide compressed air from the air compressor when the air storage tank is under pressure.

11. A vehicle structural frame of a vehicle comprising:
    an air storage tank incorporated within the vehicle structural frame;
    an air compressor to generate compressed air, wherein the air compressor is coupled to provide the compressed air to the air storage tank for storage in the air storage tank;
    an access point coupled with the air storage tank within the vehicle structural frame; and
    a plurality of hoses transporting the compressed air comprising a first type of hose connecting the air compressor to the air storage tank, and a second type of hose connecting the air storage tank to a tire of the vehicle; wherein in response to a control signal, the compressed air travels from the air storage tank, via the access point, to the tire through the second type of hose.

12. The vehicle structural frame of claim 11, wherein the vehicle structural frame is communicatively coupled with a tire, and the hose is coupled with a second access point to transport the compressed air from the vehicle structural frame to the tire via the hose.

13. The vehicle structural frame of claim 12, further comprises:
   a supply hose, wherein the supply hose is placed between the air storage tank and the access point to transfer the compressed air from the air compressor to the vehicle structural frame.

14. The vehicle structural frame of claim 11, wherein the air storage tank comprises an airtight bladder disposed within a frame rail or tube of the vehicle structural frame.

15. The vehicle structural frame of claim 11, wherein the air storage tank comprises an airtight portion of the vehicle structural frame.

16. The vehicle structural frame of claim 11, further comprises:
   an interface, wherein the interface is placed at a control panel associated with the vehicle structural frame, and wherein the interface displays an indication of the compressed air generated by the air compressor.

17. The vehicle structural frame of claim 11, wherein the air compressor is coupled to a motor of the vehicle, and the-vehicle is an electric vehicle (EV), wherein the air compressor is coupled to the motor to power the air compressor to generate the compressed air that is used to fill the air storage tank and ultimately inflate the tire of the vehicle.

18. The vehicle structural frame of claim 11, wherein the air compressor is coupled to an internal combustion engine, wherein the air compressor is coupled to the internal combustion engine to power the air compressor to generate the compressed air that is used to fill the air storage tank and ultimately inflate the tire of the vehicle.

19. The vehicle structural frame of claim 11, further comprises:
   a frame storage tank pressure monitoring sensor, wherein the frame storage tank pressure monitoring sensor compares a current measured pressure of the compressed air in the air storage tank to a threshold pressure or threshold pressure range to determine whether the air storage tank is within an acceptable range.

20. The vehicle structural frame of claim 18, further comprises:
   an actuator, wherein the actuator is configured to provide the compressed air from the air compressor when the air storage tank is under pressure.

* * * * *